(12) United States Patent
Casteras

(10) Patent No.: US 6,394,388 B2
(45) Date of Patent: May 28, 2002

(54) OPENING REINFORCEMENT FOR AEROSTAT ENVELOPE

(75) Inventor: Christophe René Jacques Marie Casteras, Toulouse (FR)

(73) Assignee: Centre National d'Etudes Spatiales, Paris Cedex (FR)

( * ) Notice: Subject to any disclaimer, the term of this patent is extended or adjusted under 35 U.S.C. 154(b) by 0 days.

(21) Appl. No.: 09/742,543

(22) Filed: Dec. 22, 2000

Related U.S. Application Data

(63) Continuation of application No. PCT/FR99/01521, filed on Jun. 24, 1999.

(30) Foreign Application Priority Data

Jun. 26, 1998 (FR) .............................. 98 08154

(51) Int. Cl.[7] .............................. B64B 1/64
(52) U.S. Cl. .............................. 244/31; 244/1 R
(58) Field of Search .............................. 244/31, 30, 97, 244/96; 24/459

(56) References Cited

U.S. PATENT DOCUMENTS

| 2,919,082 | A | * | 12/1959 | Winzen et al. |
| 3,362,275 | A | | 1/1968 | Koishikawa |
| 3,686,721 | A | * | 8/1972 | Nelson |
| 4,033,527 | A | * | 7/1977 | Parsons |
| 4,434,958 | A | * | 3/1984 | Rougeron et al. |
| 4,911,380 | A | * | 3/1990 | Regipa |
| 4,986,494 | A | * | 1/1991 | Tockert |
| 6,243,925 | B1 | * | 6/2001 | Aszody |

FOREIGN PATENT DOCUMENTS

| EP | 0 025 384 | 3/1981 |
| WO | 96/12642 | 5/1996 |

* cited by examiner

Primary Examiner—Charles T. Jordan
Assistant Examiner—T. Dinh
(74) Attorney, Agent, or Firm—Jacobson Holman, PLLC

(57) ABSTRACT

An aperture-reinforcing device for flexible envelopes which are intended to be tensioned, and in particular for aerostat envelopes, includes adjacent first and second annular members. The envelope is passed successively over the inside parts of the surfaces of the first and second annular members, then the outside part of the surface of the second annular member, and then again over the inside part of the surface of the first annular member, between itself and that part.

16 Claims, 2 Drawing Sheets

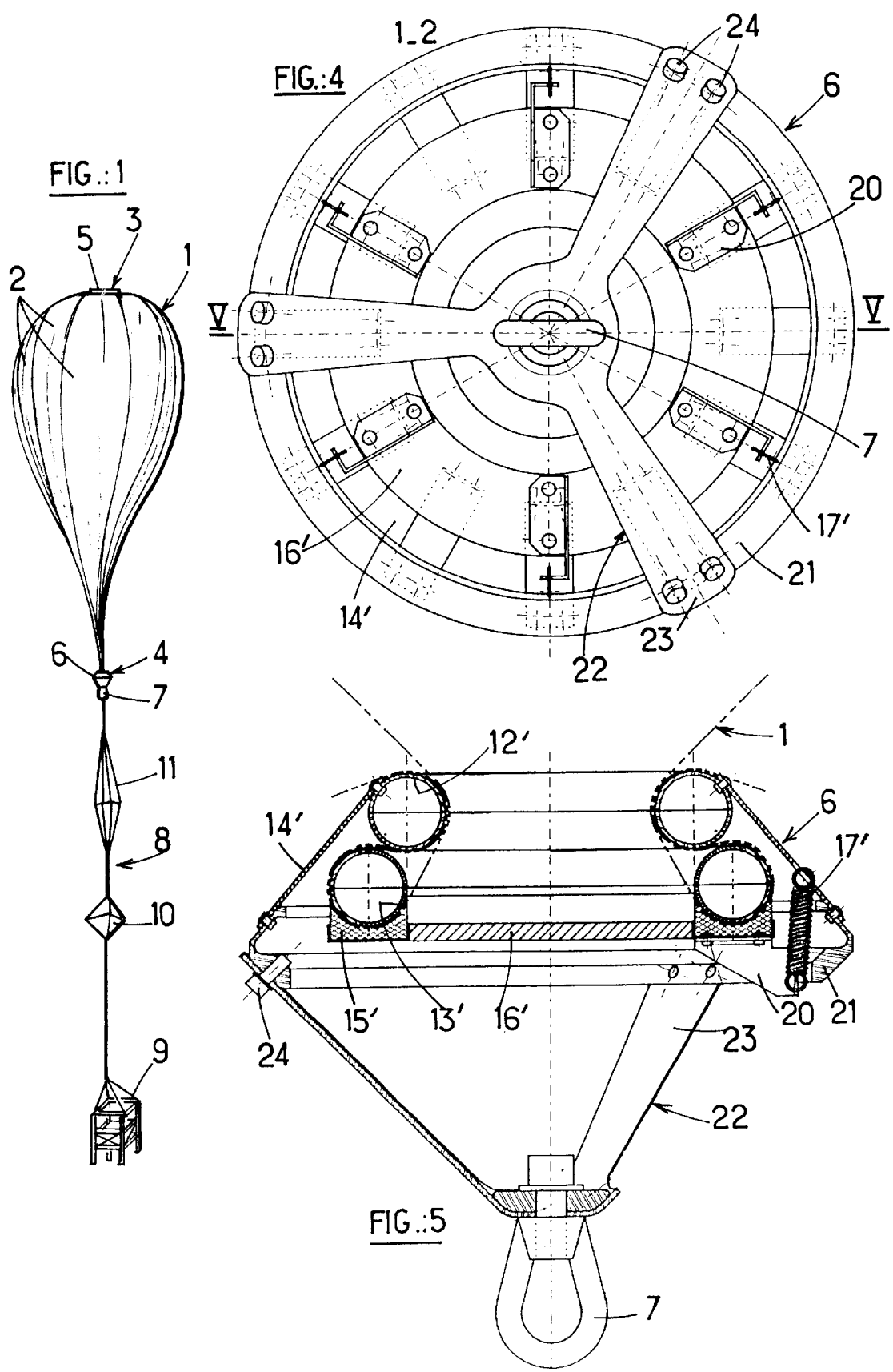

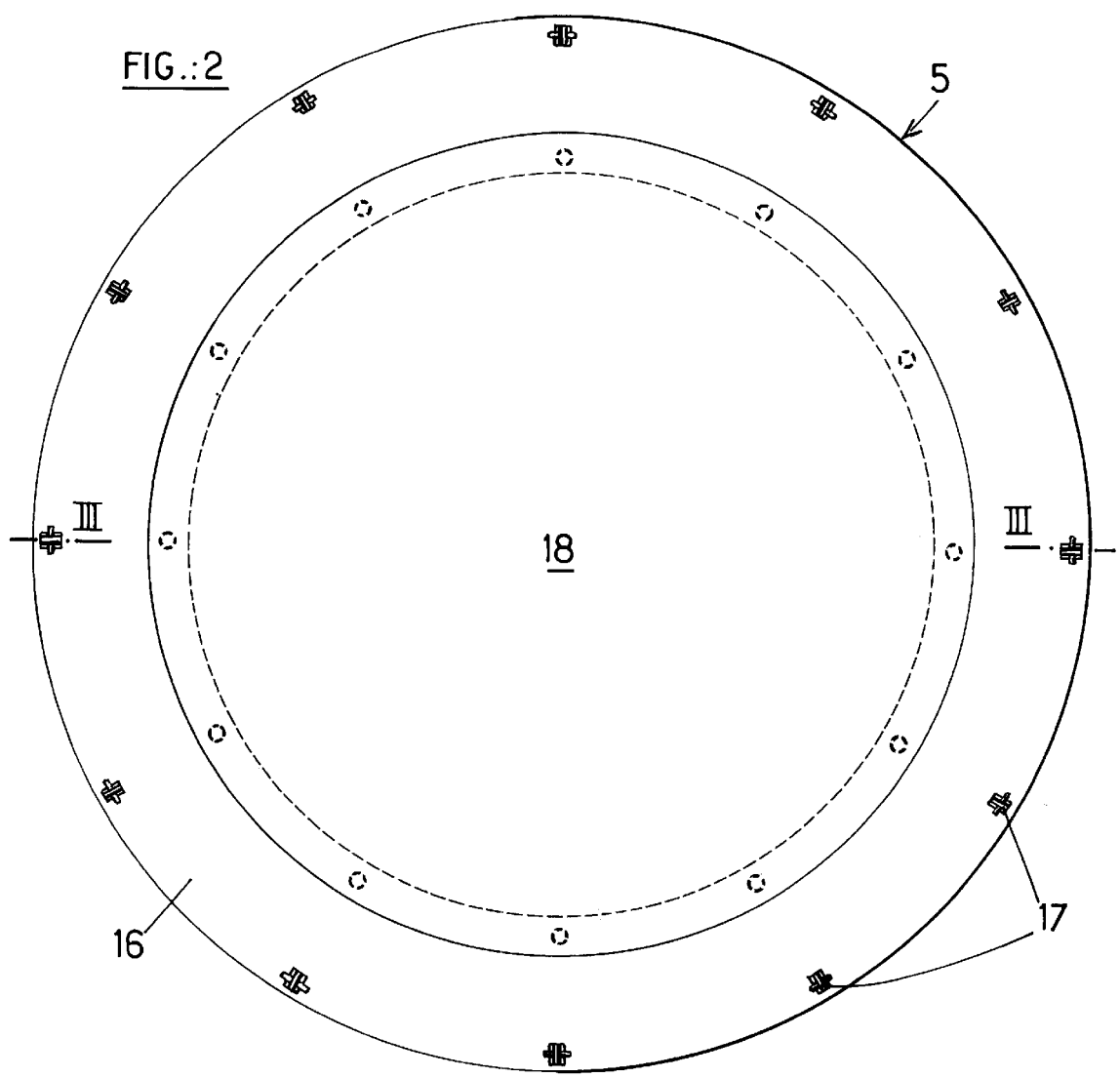
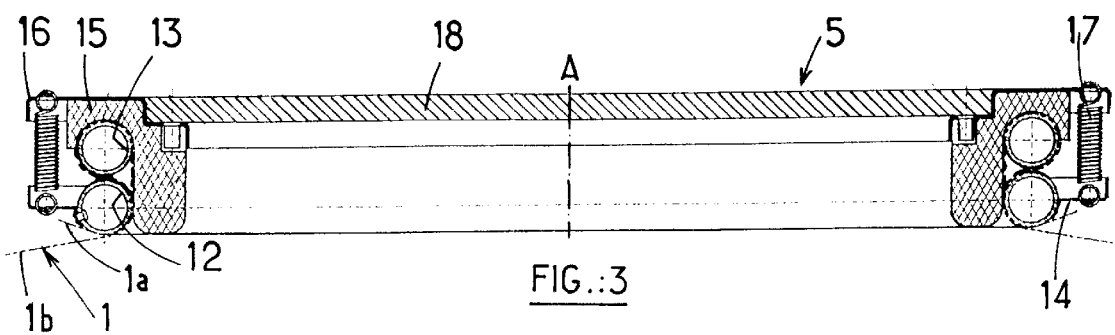

OPENING REINFORCEMENT FOR AEROSTAT ENVELOPE

This application is a continuation of International PCT Application PCT/FR/99/01521 filed on Jun. 24, 1999, which designated the United States of America.

BACKGROUND OF THE INVENTION

1. Field of the Invention

The present invention relates to an aperture-reinforcing device for flexible envelopes intended to be tensioned, and in particular to an aperture-reinforcing device for aerostat envelopes.

2. Description of the Prior Art

FIG. 1 of the accompanying drawings is a general view of a conventional experimental aerostat also known as a "sonde balloon".

As can be seen in FIG. 1, an aerostat of this kind typically includes a flexible envelope 1 filled with a gas lighter than air, such as hydrogen or helium.

The envelope comprises a plurality of plastics material film panels 2 welded together in the meridian direction and converging toward a top part 3 of the aerostat referred to as the "North Pole" and toward a bottom part 4 of the aerostat referred to as the "South Pole".

The panels 2 forming the envelope 1 are conventionally made of polyethylene reinforced with polyester fibers and the polar zones 3, 4 of the envelope 1 include aperture-reinforcing devices 5, 6 consisting either of circular flanges fixed by nuts and bolts or of components glued to the envelope.

The aperture-reinforcing device 6 of the South Pole of the balloon includes a ring 7 adapted to support a flight system 8, typically comprising a basket 9 that can carry scientific instruments, a radar reflector 10 and a parachute 11.

New composite envelope materials have recently been used to improve the strength-to-weight ratio of experimental aerostat envelopes, so that larger payloads can be carried.

For example, new generation envelope open stratosphere balloons have envelopes comprising very thin polyester panels reinforced with carbon fibers or oriented polyethylene fibers.

These extremely light materials unfortunately have the disadvantage of being prone to tearing by shear forces, i.e. forces applied in the direction transverse to the plane of the envelope.

For this reason, conventional aperture-reinforcing devices at the poles are not suitable for the new generation envelopes, because they apply high shear forces to the panels.

An object of the present invention is to provide a pole aperture-reinforcing device suitable for this new type of envelope.

SUMMARY OF THE INVENTION

The above object of the invention, and others that will become apparent on reading the following description, are met by an aperture-reinforcing device for flexible envelopes intended to be tensioned, and in particular for aerostat envelopes, the device including adjacent first and second annular members such that the envelope can pass successively over inside parts of surfaces of the first and second annular members, then over an outside part of a surface of the second annular member, and then again over the inside part of the surface of the first annular member, between itself and the part.

According to one feature of the invention the aperture-reinforcing device further includes means for urging the first and second annular members together to immobilize the envelope when it is not tensioned.

According to another feature of the invention a first flange is fixed to the periphery of the first annular member, a second flange is placed over the second annular member, and a plurality of springs is tensioned between the first and second flanges.

According to another feature of the invention a seal is disposed between the second flange and the second annular member to enable sealed closure of the aperture-reinforcing device.

According to another feature of the invention the first and second annular members are toroidal.

Because of the above features, the aperture-reinforcing device according to the invention applies low shear forces to the panels of the envelope in the polar zones.

What is more, an aperture-reinforcing device according to the invention can be made from a small number of components, reducing its mass and its manufacturing cost.

Other features and advantages of the present invention will become apparent on reading the following description and examining the accompanying drawings, wherein like numerals refer to like parts throughout.

BRIEF DESCRIPTION OF THE DRAWINGS

FIG. 1 is a general view of an experimental aerostat described in the preamble of this description.

FIG. 2 is a top view of an aperture-reinforcing device according to the invention for reinforcing the North Pole of the envelope of an experimental aerostat.

FIG. 3 is a view of the same aperture-reinforcing device in section taken along the line III—III in FIG. 2.

FIG. 4 is a bottom view of an aperture-reinforcing device according to the invention for reinforcing the South Pole of the envelope of an experimental aerostat.

FIG. 5 is a view of the same aperture-reinforcing device in section taken along the line V—V in FIG. 4.

DETAILED DESCRIPTION OF THE PREFERRED EMBODIMENT

Although only one preferred embodiment of the invention is explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

In the figures, identical reference numerals designated identical or similar units.

The aperture-reinforcing device according to the invention is described hereinafter when incorporated into an experimental aerostat, because this is a particularly suitable application of the invention.

Nevertheless, it must be borne in mind that the aperture-reinforcing device could be equally suitable for any other application in which it is necessary to immobilize a flexible envelope that is intended to be tensioned.

FIGS. 2 and 3 show a first aperture-reinforcing device 5 for reinforcing the North Pole of the envelope 1 of an experimental balloon.

As shown in FIGS. 2 and 3, the first aperture-reinforcing device includes first and second adjacent annular members 12 and 13 at its periphery, which members are preferably tubular and toroidal and preferably have the same radius.

A first annular flange 14 is fixed to the outside periphery of the first annular member 12.

An annular seal 15 is shaped to fit over the second annular member 13.

A second annular flange 16 is placed over the seal 15.

A plurality of springs 17 under tension between the first and second flanges 14 and 16 pull them toward each other.

A cover 18 fixed and sealed to the second flange 16 closes the aperture-reinforcing device.

A system (not shown) can be provided for opening the cover under remote control in order to release progressively the gas contained in the envelope 1.

For example, the first and second annular members 12 and 13 and the first and second flanges 14 and 16 can be made of aluminum or light alloy. The seal 15 can be made from a closed-cell elastomer material.

The aperture-reinforcing device 5 is fitted to the North Pole of the envelope 1 of the aerostat in the following manner (the envelope is shown in chain-dotted line in FIG. 3).

With the envelope 1 of the aerostat empty of gas, the first annular member 12 with the first flange 14 fixed to it is placed around the polar orifice of the envelope.

The second annular member 13 is then superposed on the first annular member 12.

The free edge 1a of the envelope 1 is seized and passed over the interior parts of the surfaces of the first and second annular members 12 and 13 (i.e. over the parts of those surfaces which face toward the axis A of the aperture-reinforcing device).

The envelope 1 is then folded around the second annular member 13 so that it passes over the outside portion of its surface.

The envelope 1 is then passed again over the inside part of the surface of the first annular member 12, between itself and that part, and its free edge 1a is brought out as far as the outside part of the surface of that member.

The seal 15 is then nested over the second annular member 13, after which the second flange 16 is placed over the seal 15.

The springs 17 are then tensioned between the first and second flanges 14 and 16, after which the cover 18 is fixed to the second flange 16.

When the aerostat is inflated, the envelope 1 is tensioned. The portion of the envelope under tension that extends around the aperture-reinforcing device 5 is designated by the reference numeral 1b in FIG. 3.

Tensioning the envelope 1 immobilizes it against the first and second annular members 12 and 13, as is clear from the description of how the envelope 1 is wrapped around those members.

The envelope 1 presses the second annular member 13 against the first annular member 12, thereby jamming the envelope portion that passes between the two members.

The tensioned envelope 1 also jams the envelope portion that passes between itself and the inside part of the surface of the first annular member 12.

The springs 17 pull the first and second annular members 12 and 13 against each other and immobilize the envelope 1, even when it is not tensioned.

The springs also press the seal 15 against the second annular member 13 to seal the aperture-reinforcing device.

It should now be clear that the aperture-reinforcing device 5 eliminates the risk of shearing the envelope 1: all that is required to ensure this is to choose sufficiently large radii for the substantially circular sections of the first and second annular members 12 and 13.

It is also clear that the aperture-reinforcing device 5 can be made from a small number of components: very few screws are needed, in contrast to conventional pole-reinforcing devices.

It is finally clear that the aperture-reinforcing device 5 can be demounted very easily, whereas this is difficult with the conventional reinforcing devices.

FIGS. 4 and 5 show a second aperture-reinforcing device 6 for reinforcing the South Pole of the envelope 1 of an experimental aerostat.

Most components of the second aperture-reinforcing device are analogous to those of the first aperture-reinforcing device 5. They are therefore described very briefly, without expanding on their functions.

As can be seen in FIGS. 4 and 5, the second aperture-reinforcing device 6 includes adjacent first and second annular members 12' and 13' at its periphery. Those members are preferably tubular and toroidal.

The radius of the first annular member 12' is preferably slightly less than that of the second annular member 13'.

This difference in their radii holds the envelope 1 in contact with the first annular member 12' regardless of the inclination of the envelope relative to that member. This feature guarantees immobilization of the envelope during the inflation phase in particular.

An annular flange 14' defining a substantially frustoconical volume is fixed to the outside periphery of the first annular member 12'.

An annular seal 15' is shaped to fit over the second annular member 13'.

A circular flange 16' forming a cover is placed over the seal 15'.

A plurality of springs 17' in tension between the flange 14' and brackets 20 fastened to the flange 16' pull the flanges toward each other.

Unlike the first aperture-reinforcing device 5, the second aperture-reinforcing device 6 also includes a ring 21 fixed to the periphery of the flange 14' and supporting a ring assembly 22.

The ring assembly can include a tripod 23, for example, fixed by screws 24 to the ring 21 and supporting the ring 7 previously mentioned.

Of course, the invention is not limited to the embodiment and the application described and shown, which are included merely by way of example.

For example, without limiting the scope of the invention, the aperture-reinforcing device according to the invention could equally well be used for the inflation orifices of "ZODIAC" (registered trademark) class inflatable boats.

The annular members described above could have a non-circular contour, for example an elliptical contour, although it is preferable for the contour to be looped and without discontinuities.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

There is claimed:

1. An aperture-reinforcing device on a flexible envelope defining a gas container, said device including adjacent first and second annular members such that said envelope can pass successively over inside parts of surfaces of said first and second annular members, then over an outside part of said surface of said second annular member, and then again over said inside part of said surface of said first annular member, between said envelope and said inside part of said surface of said first annular member.

2. The aperture-reinforcing device claimed in claim 1, further including means for urging said first and second annular members together to immobilize said envelope when in a non-tensioned state.

3. The aperture-reinforcing device claimed in claim 1, wherein said first and second annular members are tubular and toroidal.

4. The aperture-reinforcing device claimed in claim 1, wherein said first and second annular members have the same radius.

5. The aperture-reinforcing device claimed in claim 1, wherein said first annular member has a radius slightly less than that of said second annular member.

6. An aerostat envelope comprising a North Pole and a South Pole and at least one aperture-reinforcing device at one of said North Pole and South Pole, said device including adjacent first and second annular members such that said envelope can pass successively over inside parts of surfaces of said first and second annular members, then over an outside part of said surface of said second annular member, and then again over said inside part of said surface of said first annular member between said envelope and said inside part of said surface of said first annular member.

7. The envelope claimed in claim 6, further including means for urging said first and second annular members together to immobilize said envelope when in a non-tensioned state.

8. The envelope claimed in claim 6, wherein said first and second annular members are tubular and toroidal.

9. The envelope claimed in claim 6, wherein said first and second annular members have the same radius.

10. The envelope claimed in claim 6, wherein said first annular member has a radius slightly less than that of said second annular member.

11. An aperture-reinforcing device for a flexible envelope, said device comprising adjacent first and second annular members for passing the flexible envelope over surfaces of said first and second annular members, an urging member for urging said first and second annular members together to immobilize said flexible envelope when in a non-tensioned state, a first flange fixed to a periphery of said first annular member, a second flange placed over said second annular member, and a plurality of springs tensioned between said first and second flanges.

12. The aperture-reinforcing device claimed in claim 11, wherein a seal is disposed between said second flange and said second annular member to enable sealed closure of said aperture-reinforcing device.

13. The aperture-reinforcing device claimed in claim 11, further including a load-support ring fixed to said first flange.

14. An aerostat envelope comprising a North Pole and a South Pole and at least one aperture-reinforcing device at one of said poles, said device includes adjacent first and second annular members, an urging member for urging said first and second annular members together to immobilize said envelope when in a non-tensioned state, a first flange fixed to the periphery of said first annular member, a second flange placed over said second annular member, and a plurality of springs tensioned between said first and second flanges, said envelope passing over surfaces of said first and second annular members.

15. The envelope claimed in claim 14, wherein a seal is disposed between said second flange and said second annular member to enable sealed closure of said aperture-reinforcing device.

16. The envelope claimed in claim 14, further including a load-support ring fixed to said first flange.

* * * * *